(12) United States Patent
Ghoneim et al.

(10) Patent No.: US 8,002,070 B2
(45) Date of Patent: Aug. 23, 2011

(54) MOTOR VEHICLE HAVING A SWITCHABLE FOUR WHEEL DRIVE

(75) Inventors: Youssef Ghoneim, Rochester, MI (US); Veit Held, Bensheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 77 days.

(21) Appl. No.: 12/413,374

(22) Filed: Mar. 27, 2009

(65) Prior Publication Data

US 2009/0250283 A1    Oct. 8, 2009

(30) Foreign Application Priority Data

Apr. 2, 2008    (EP) ..................................... 08006737

(51) Int. Cl.
*B60K 17/34*    (2006.01)

(52) U.S. Cl. ...................................................... 180/245
(58) Field of Classification Search .................. 180/245, 180/246; 701/69
See application file for complete search history.

(56) References Cited

U.S. PATENT DOCUMENTS

| 7,614,470 B2* | 11/2009 | Peterson et al. .............. 180/197 |
| 2005/0222739 A1* | 10/2005 | Mori ............................... 701/69 |
| 2009/0082934 A1* | 3/2009 | Mizon et al. .................... 701/68 |

* cited by examiner

*Primary Examiner* — Tony H. Winner
(74) *Attorney, Agent, or Firm* — Ingrassia Fisher & Lorenz, P.C.

(57) ABSTRACT

A motor vehicle is provided that has an engine, front and rear wheels and a clutch system for selectively distributing engine torque to the front and rear wheels. A controller judges in real time the state of motion of the vehicle and controls the torque distribution by the clutch system according to the judged state.

10 Claims, 2 Drawing Sheets

MOTOR VEHICLE HAVING A SWITCHABLE FOUR WHEEL DRIVE

CROSS-REFERENCE TO RELATED APPLICATION

This application claims priority to European Patent Application No. 08006737.4-1523, filed Apr. 2, 2008, which is incorporated herein by reference in its entirety.

TECHNICAL FIELD

The present invention relates to a motor vehicle in which torque from an engine of the motor vehicle is selectively applicable to front and rear wheels. Conventionally, motor vehicles of this type have a clutch system formed of at least two clutches, at least one of which can be opened and closed by the driver in order to switch between a front wheel drive mode (or a rear wheel drive mode) and a four wheel drive mode.

BACKGROUND

Although initially conceived for off-road driving, it has been found that four wheel drives can be advantageous for on-road driving too, since they are less susceptible to problems like speed-dependent oversteer or understeer, which are common with front or rear wheel driven vehicles. However, the advantage of improved steerability of four wheel driven vehicles tends to be outweighed by their fuel consumption, which is generally higher than that of a similar two-wheel driven vehicle, due to the increased mass of rotating components and to increased friction losses. A driver who is in want of the improved steerability of the four wheel drive is thus continuously penalized by high fuel consumption, whereas a driver who practices an economical driving style has to take the risk of sub-optimal steerability.

At least one object of the present invention is to provide a motor vehicle, a method for controlling a clutch system in a motor vehicle and a data processor program product which allow combining the improved steerability of the four wheel drive with the economic operation of front or rear wheel drives. In addition, other objects, desirable features, and characteristics will become apparent from the subsequent summary and detailed description, and the appended claims, taken in conjunction with the accompanying drawings and this background.

This at least one object, and other objects, desirable features, and characteristics, is achieved, according to a first embodiment of the invention, by providing a motor vehicle having an engine, front and rear wheels and a clutch system for selectively distributing engine torque to the front and rear wheels with a controller for judging in real time the state of motion of the vehicle and controlling the torque distribution by the clutch system according to the judged state.

Based on this judgment, the distribution of the torque to the front and rear axles is continuously adapted to current driving conditions, and the use of the four wheel drive may be restricted to situations where it is effectively helpful.

Control of the torque distribution is preferably carried out by the controller selecting one from a plurality of pre-determined discrete distribution ratios. In this way, if there are other parameters of the vehicle chassis besides the torque distribution which are also adapted according to the judged state of motion, the number of possible combinations of values of the torque distribution and of the other parameter(s) is finite, and each combination can be checked for operational safety, and selection of an unsafe parameter combination can be prevented easily.

The controller should be adapted to distinguish between at least a high acceleration state and a low acceleration state.

In the high acceleration state, being more susceptible to oversteer or understeer, the torque transmitted by the clutch system should be distributed more evenly between front and rear wheels (i.e., should be more like that of a four wheel drive than in a low acceleration state).

In order to prevent the wheels of the vehicle from slipping, in particular in case of high longitudinal acceleration, the controller is preferably adapted to apply a higher portion of the torque to the rear wheels in a high acceleration state than in a low acceleration state.

Generally speaking, a high acceleration state may be judged to exist if at least one of the following conditions is met:

the lateral acceleration of the vehicle exceeds a first predetermined threshold;
the longitudinal acceleration of the vehicle exceeds a second predetermined threshold;
the side-slip velocity of the vehicle exceeds a third predetermined threshold;
the rate of change of a steering wheel angle exceeds a fourth predetermined threshold;
the rate of change of the accelerated pedal or the throttle position or the fuel injection rate exceeds a fifth predetermined threshold; and/or
the vehicle is in an engine braking mode.

At least in the last three cases, the amount of acceleration at the instant of judging may still be small, but it is clear to the skilled person that a substantial acceleration is likely to occur soon if the steering wheel is turned quickly or the accelerator pedal is depressed quickly. In the engine braking mode, acceleration with a negative sign has to be expected.

Further, the controller is preferably adapted to distinguish between a high speed state and a low speed state and to distribute the torque transmitted by the clutch system between front and rear wheels more evenly in the low speed state than in the high speed state. By applying driving torque to front and rear wheels while the vehicle is moving slowly or standing still, launching the vehicle on slippery ground is facilitated.

According to a second embodiment of the invention, the at least object, and other objects, desirable features, and characteristics, is achieved by a method for controlling a clutch system in a motor vehicle for selectively distributing engine torque to front and rear wheels of the vehicle, in which the state of motion of the vehicle is judged in real time, and the torque distribution by said clutch system is controlled according to the judged state.

The embodiments of the invention may be embodied by a data processor program product comprising a data carrier in which program instructions for enabling a data processor to form the controller described above or to carry out the method said out above are recorded in machine readable form.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit application and uses. Furthermore, there is no intention to be bound by any theory presented in the preceding summary and background or the following detailed description.

Figure 1:
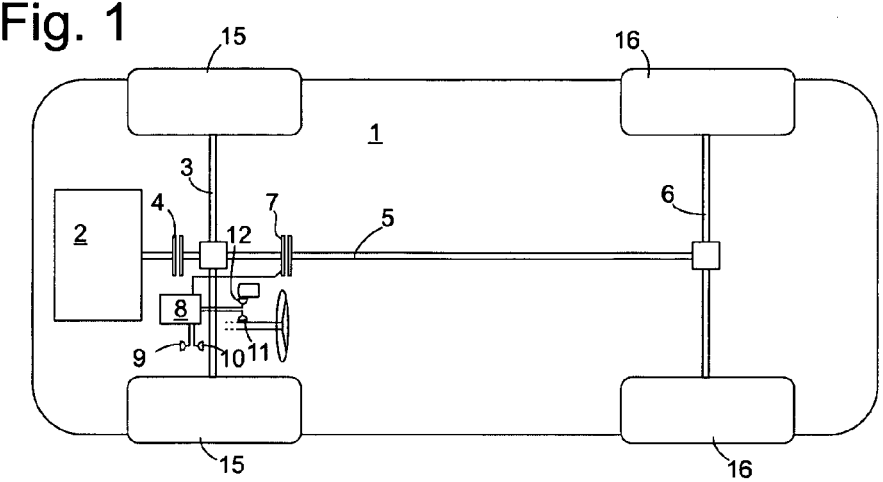
FIG. 1 is a block diagram of a motor vehicle according to a first embodiment of the invention.

In the block diagram of FIG. 1, a combustion engine 2 of motor vehicle 1 drives wheels 15 of a front axle 3 via a first clutch 4. In a drive shaft 5 between front axle 3 and rear axle 6, a second clutch 7 is provided. If this second clutch 7 is opened, the vehicle is driven by the front wheels 15 alone; if it is closed, it is additionally driven by rear wheels 16. The ratio between the torque applied to the front wheels 15 and that of the rear wheels 16 depends on the closing force applied to clutch 7. While clutch 4 may be exclusively under control of the driver, clutch 7 is controlled by an electronic control unit 8 based on signals from a variety of sensors, such as an acceleration sensor 9, yaw rate sensor 10, steering wheel angle sensor 11 or accelerator pedal sensor 12. The accelerator pedal sensor 12 may be replaced by an intake air throttle sensor, not shown, or by a fuel supply rate signal from an electronic engine controller, not shown, since throttle position or fuel rate are usually directly controlled based on the accelerator pedal position.

Figure 2:
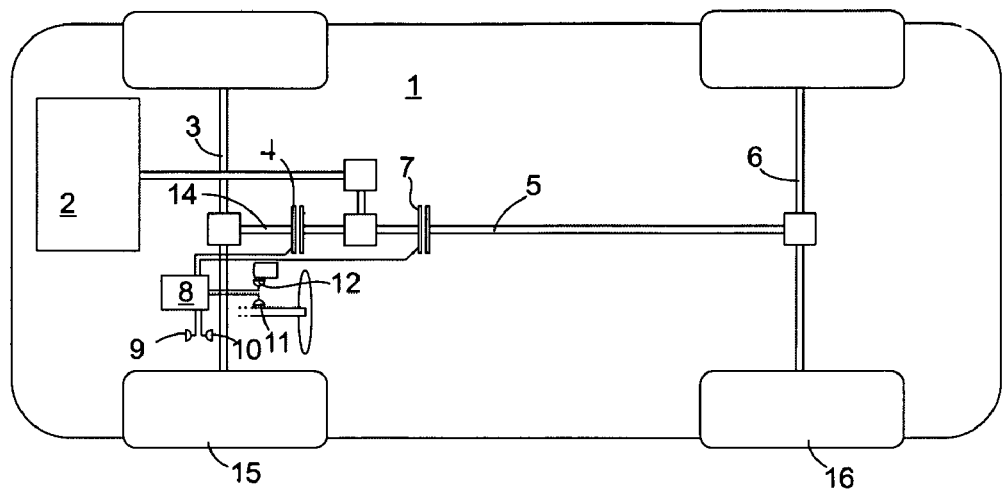
FIG. 2 is a block diagram of a motor vehicle according to a second embodiment of the invention.

The power train layout of FIG. 2 differs from the one shown in FIG. 1 in that the engine drives two drive shafts 5, 14 via a central differential 13. The front drive shaft 14 comprises clutch 4, the rear drive shaft 5 comprises clutch 7. Depending on the state of clutches 4, 7 set by control unit 8, it is possible to apply the engine torque only to the front axle 3, only to the rear axle 6, or to establish any arbitrary torque distribution ratio between the two axles 3, 6.

The control procedure carried out by electronic control unit 8 is similar for the two power train layouts of FIG. 1 and 2 and will be described in detail referring to FIG. 3 to FIG. 5.

Figure 3:
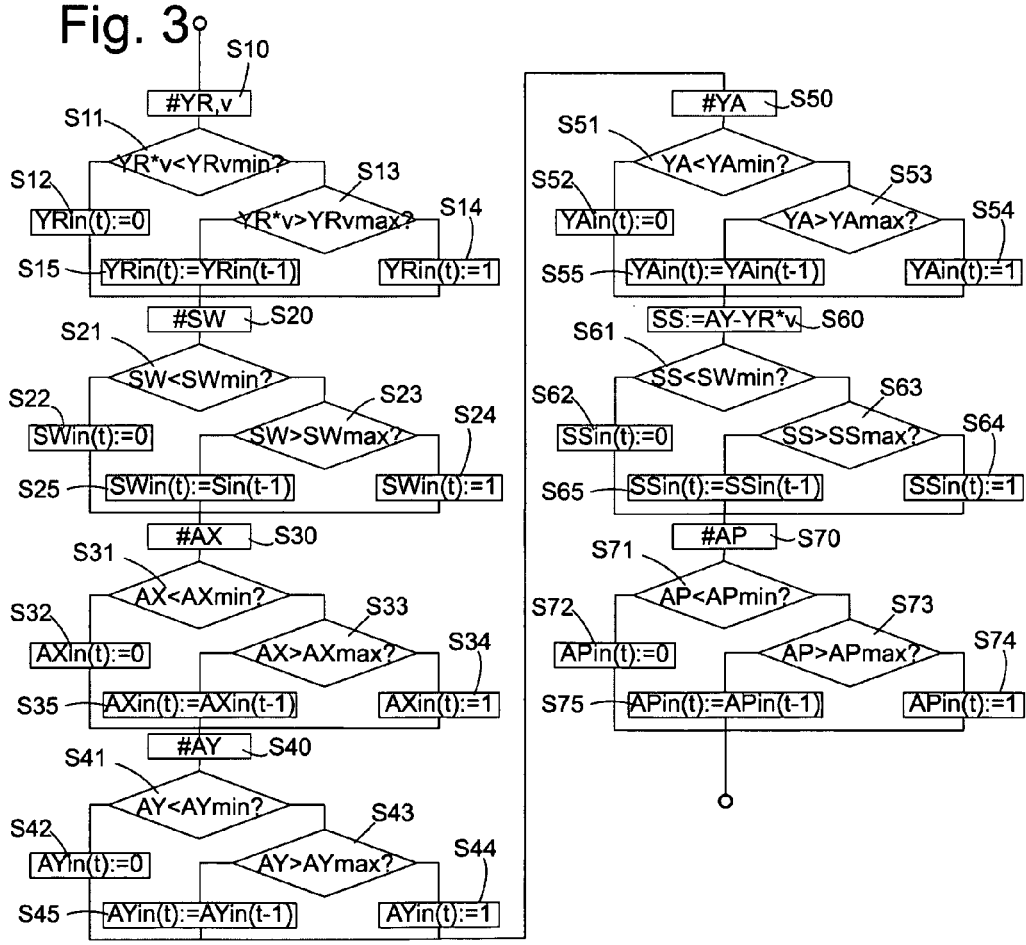
FIG. 3 is a flow chart of a first part of a control process carried out by the controller of the vehicle of FIG. 1 or FIG. 2.

FIG. 3 relates to a first part of the control process in which the current state of motion of the vehicle 1 is evaluated. This first part of the process may be subdivided into a number of stages, each of which is concerned with a specific motion parameter of the vehicle 1.

In the diagram of FIG. 3, the first stage is concerned with the yaw rate YR. It is detected using sensor 10 in step S10. Step S11 calculates the product of the yaw rate YR and the present longitudinal velocity v of the vehicle and compares it to a first threshold YRvmin. YR*v is a measure of the lateral acceleration to which the vehicle would be subjected to if it was driving through a curve with yaw rate YR and speed v and no over- or understeer. If YR*v is found to be smaller than a first threshold YRvmin, indicating that the vehicle is cornering slowly and there is no risk of over- or understeer, an index YRin(t) at that present instant t is set to zero in step S12. Otherwise, YR*v is compared to a second, higher threshold YRvmax in step S13. If this threshold is exceeded, the index YRin(t) is set to one in step S14, and if not, it is maintained at the value YRin(t-1) it received at a previous iteration of the process in step S15.

The second stage comprising steps S20 to S25 deals with the time derivative SW of the steering wheel angle detected by sensor 11. If the amount of the derivative SW is found to be below a first threshold SWmin in step S21, lateral forces acting on the vehicle are not expected to vary substantially, and a steering wheel index SWin(t) is set to zero in step S22. If not, the derivative SW is compared to a second, higher threshold SWmax in step S23, and if the threshold is exceeded, step S24 sets the index SWin(t) to one. Otherwise, the index remains unchanged (step S25).

As will be readily apparent from FIG. 3, steps S30 to S35, S40 to S45, S50 to S55, S60 to S65 and S70 to S75 are all analogous to steps S20 to S25, the only difference being in the motion parameter which is measured or calculated and then evaluated in the various stages. In steps S30 to S35, it is the longitudinal acceleration AX, as measured by acceleration sensor 9 or obtained as the time derivative of a speedometer signal; in steps S40 to S45 it is the lateral acceleration AY detected by acceleration sensor 9, in steps S50 to S55, it is the yaw acceleration YA, i.e. the time derivative of YR, in steps S60 to S65, it is the sideslip rate SS calculated in step S60 by forming the difference of the lateral acceleration AY and YR*v, and in steps S70 to S75, it is the time derivative AP of the accelerator pedal position detected by sensor 12.

It will be readily apparent to the skilled person that the order of the stages in FIG. 3 is arbitrary, and that it is not necessary to evaluate all of the indices, shown in FIG. 3, but that in a simplified embodiment of the method any subset of these indices might be sufficient.

Figure 4:
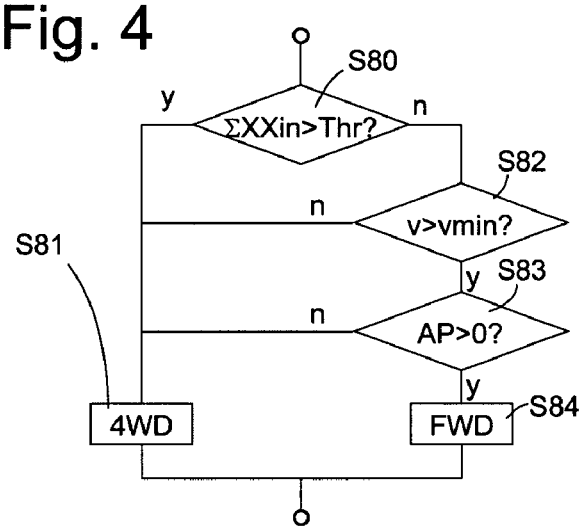
FIG. 4 is a flow chart of a second part of the process according to a first alternative.

In a second part of the process, according to the flow chart of FIG. 4, the indices are evaluated in step S80. The evaluation of step S80 is written generally as:

$$\Sigma XXin > Thr,$$

Wherein XX stands for the motion parameters YR, SW, AX, AY, YA, AP discussed with respect to FIG. 3, and $\Sigma$ stands for a sum of the indices obtained in the first part of the process. Setting Thr=1 is equivalent to OR-ing the indices: if just one of the indices equals 1 the condition of step S80 is fulfilled, and control unit 8 controls the clutches to establish a four wheel drive mode in step S81. If the threshold Thr is not exceeded, the process branches to step S82, in which the current longitudinal speed v is compared to a low threshold vmin which may be in a range of 10 km/h or even less. If the speed v is below this threshold, the vehicle is judged to be in a launching condition. Here there is a particular risk of the vehicle wheels spinning, if the vehicle is being launched on slippery (e.g., loose or frozen, ground), so that the process enters the four wheel drive mode in step S81, too. Only if the speed v is above the threshold vmin, the process proceeds to step S83, in which the accelerator pedal position AP is checked. If it is not depressed, and a clutch pedal is not depressed, either, the control unit 8 concludes that the vehicle is in an engine braking mode, and branches to step S81, so that all four wheels 15, 16 may contribute to the braking effect. Otherwise, a two-wheel drive mode is entered, which may be the front wheel drive mode in case of the vehicle 1 of FIG. 1 or any of front and rear wheel drive modes in case of the vehicle 1 of FIG. 2.

It should be noted that the mode entered in step S83 may not be pure front wheel drive mode, but can also be a four wheel drive mode in which the portion of the engine torque transmitted to the rear wheels is less than in the four wheel drive mode of step S81.

If the threshold Thr of step S80 is set equal to the number of indices determined in the first part of the method, i.e. equal to 7 in the case of the method shown in FIG. 3, the decision of step S80 amounts to ANDing the various indices. Of course, the threshold might also be set at an intermediate value i between 1 and the total number n=7 of indices, so that step S80 amounts checking whether at least i indices are equal to 1.

As will be readily apparent to the skilled person, the sum of step S80 might be a weighted sum, in which an index which is highly correlated to the vehicle's tendency to over- or understeer is assigned a higher weighting coefficient than an index which is less closely correlated.

Figure 5:
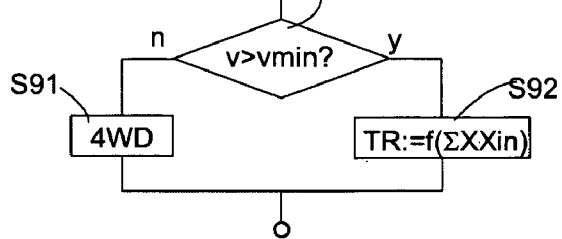
FIG. 5 is a flow chart of the second part of the process according to a second alternative.

Instead of using the number of indices equaling 1 only as a criteria for a binary selection selecting between four wheel drive and two-wheel drive modes, as shown in FIG. 4, it is possible to chose between various forward drive modes having different ratios of torque distribution between front and rear axles, as shown in FIG. 5. Here, step S90 checks for the vehicle speed and enters the four wheel drive mode having a fixed distribution ratio of, for example, 50 to 50 (step S91), if the vehicle speed is below the threshold vmin. Otherwise, the percentage TR of the torque transmitted to the rear wheels may be a function f($\Sigma$XXin) of the possibly weighted sum of the indices. While f(0) may be zero or 100%, which corresponds to pure front wheel drive or pure rear wheel drive, respectively, in case of all indices being zero and the vehicle being perfectly stable, TR will monotonically increase with $\Sigma$XXin until it reaches a value, typically in a range from about 30% to 70%, in which the vehicles tendency to oversteer or understeer is substantially reduced. Although not shown, a step of checking for engine braking may also be provided in the process of FIG. 5.

The overall process of FIGS. 3 and 4 or FIGS. 3 and 5 is repeated over and over while the vehicle 1 is moving. An iteration of the process may be triggered in regular time intervals or by any substantial change in any of the motion parameters which are evaluated in the first part of the process. In one exemplary embodiment, a computer readable medium embodying a computer program product is provided. The computer program product, when executed by a processor, may cause the following steps to be performed: judge in real time a state of motion of a vehicle with a front wheel and a rear wheel; control a torque distribution between the front wheel and the rear wheel by a clutch system according to the state of motion of the vehicle judged in real time; and control the torque distribution by selecting one of a plurality of pre-determined discrete distribution ratios.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A motor vehicle, comprising:
an engine;
a front wheel;
a rear wheel;
a clutch system configured to selectively distribute torque of the engine to the front wheel and the rear wheel; and
a controller configured to:
judge in real time a state of motion of the motor vehicle;
control a torque distribution between the front wheel and the rear wheel by the clutch system according to the state of motion judged in real time; and
control the torque distribution by selecting one of a plurality of pre-determined discrete distribution ratios.

2. The motor vehicle claim 1, wherein the controller is further configured to distinguish between a high speed state and a low speed state and to distribute the torque transmitted by the clutch system between the front wheel and the rear wheel more evenly in the low speed state than in the high speed state.

3. The motor vehicle of claim 1, wherein the controller is further configured to distinguish between at least a high acceleration state and a low acceleration state.

4. The motor vehicle of claim 3, wherein the controller is further configured to distribute the torque transmitted by the clutch system between the front wheel and the rear wheel more evenly in the high acceleration state than in the low acceleration state.

5. The motor vehicle of claim 3, wherein the controller is further configured to apply a higher portion of the torque to the rear wheel in the high acceleration state than in the low acceleration state.

6. The motor vehicle of claim 3, wherein the controller is further configured to judge the motor vehicle to be in the high acceleration state if at least one of a following conditions is met:
a lateral acceleration of the motor vehicle exceeds a first predetermined threshold;
a longitudinal acceleration of the motor vehicle exceeds a second predetermined threshold;
a side-slip velocity of the motor vehicle exceeds a third predetermined threshold;
a rate of change of a steering wheel angle exceeds a fourth predetermined threshold;
the rate of change of at least of an accelerator pedal, throttle position, or fuel injection rate exceeds a fifth predetermined threshold; or
the motor vehicle is in an engine braking mode.

7. The motor vehicle of claim 3, wherein the controller is further configured to judge the motor vehicle to be in the high acceleration state if at least two of the following conditions is met:
a lateral acceleration of the motor vehicle exceeds a first predetermined threshold;
a longitudinal acceleration of the motor vehicle exceeds a second predetermined threshold;
a side-slip velocity of the motor vehicle exceeds a third predetermined threshold;
a rate of change of a steering wheel angle exceeds a fourth predetermined threshold;
the rate of change of at least of an accelerator pedal, throttle position, or fuel injection rate exceeds a fifth predetermined threshold; or
the motor vehicle is in an engine braking mode.

8. The motor vehicle of claim 3, wherein the controller is further configured to judge the motor vehicle to be in the high acceleration state based on
a lateral acceleration of the motor vehicle;
a longitudinal acceleration of the motor vehicle;
a side-slip velocity of the motor vehicle;
a rate of change of a steering wheel angle;
a rate of change of at least of an accelerator pedal, throttle position, or fuel injection rate; and
an engine braking mode of the motor vehicle.

9. A method for controlling a motor vehicle having an engine, a front wheel, a rear wheel, a clutch system configured to selectively distribute torque of the engine to the front wheel and the rear wheel; comprising the steps of:
- judging in real time a state of motion of the motor vehicle;
- controlling a torque distribution between the front wheel and the rear wheel by the clutch system according to the state of motion judged in real time; and
- controlling the torque distribution by selecting one of a plurality of pre-determined discrete distribution ratios.

10. A computer readable medium embodying a computer program product, said computer program product when executed by a processor cause the following steps to be performed:
- judge in real time a state of motion of a vehicle with a front wheel and a rear wheel;
- control a torque distribution between the front wheel and the rear wheel by a clutch system according to the state of motion of the vehicle judged in real time; and
- control the torque distribution by selecting one of a plurality of pre-determined discrete distribution ratios.

* * * * *